United States Patent
Ali et al.

(10) Patent No.: US 9,390,294 B2
(45) Date of Patent: Jul. 12, 2016

(54) VIRTUALIZED DEVICE CONTROL IN COMPUTER SYSTEMS

(75) Inventors: Valiuddin Y. Ali, Cypress, TX (US); Jeffrey Kevin Jeansonne, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 187 days.

(21) Appl. No.: 14/241,132

(22) PCT Filed: Sep. 30, 2011

(86) PCT No.: PCT/US2011/054110
§ 371 (c)(1),
(2), (4) Date: Feb. 26, 2014

(87) PCT Pub. No.: WO2013/048422
PCT Pub. Date: Apr. 4, 2013

(65) Prior Publication Data
US 2014/0201743 A1     Jul. 17, 2014

(51) Int. Cl.
*G06F 9/46* (2006.01)
*G06F 9/455* (2006.01)
(Continued)

(52) U.S. Cl.
CPC ............. *G06F 21/82* (2013.01); *G06F 9/4411* (2013.01); *G06F 9/45533* (2013.01);
(Continued)

(58) Field of Classification Search
CPC ............ G06F 21/57; G06F 21/82; G06F 2009/45579; G06F 2009/45587; G06F 9/4411; G06F 9/45533; G06F 21/575; G06F 21/53; G06F 21/6227; G06F 21/6218; G06F 9/45558; G06F 9/45537; G06F 9/4426; G06F 9/45541; G06F 9/45504; G06F 9/5077; G06F 9/441; G06F 9/4812
See application file for complete search history.

(56) References Cited

U.S. PATENT DOCUMENTS 6,587,876 B1    7/2003  Mahon et al.
8,127,292 B1 *  2/2012  Dobrovolskiy ..... G06F 9/45541
                                                        717/174
(Continued)

FOREIGN PATENT DOCUMENTS

JP    H09-069077    3/1997
JP    2001265612    9/2001
(Continued)

OTHER PUBLICATIONS

Vincent J. Zimmer, System Isolation Beyond BIOS using the Unified Extensible Firmware Interface, 2008, [Retrieved on Mar. 28, 2016]. Retrieved from the internet: <URL: https://www.researchgate.net/profile/Vincent_Zimmer/publication/221199704_System_Isolation_Beyond_BIOS_using_the_Unified_Extensible_Firmware_Interface/links.pdf> 7 Pages (1-7).*
(Continued)

*Primary Examiner* — Thuy Dao
*Assistant Examiner* — Anibal Rivera
(74) *Attorney, Agent, or Firm* — HPI Patent Department

(57) ABSTRACT

Virtual device control in a computer system is described. Examples include: obtaining a device configuration policy from firmware in the computer system, the device configuration policy defining global access permissions to at least one embedded device in the computer system applied at boot time. Obtaining a virtual device configuration policy established for at least one of a selected user or a selected virtual machine (VM), the virtual device configuration policy defining additional access permissions to the at least one embedded device. Establishing a virtual hardware definition for an instance of the selected VM executing on the computer system based on the global access permissions and the additional access permissions.

19 Claims, 3 Drawing Sheets

(51) Int. Cl.
*G06F 11/30* (2006.01)
*G06F 21/82* (2013.01)
*G06F 21/57* (2013.01)
*G06F 9/44* (2006.01)
*G06F 21/53* (2013.01)
*G06F 21/62* (2013.01)

(52) U.S. Cl.
CPC .............. *G06F 9/468* (2013.01); *G06F 21/57* (2013.01); *G06F 21/53* (2013.01); *G06F 21/6218* (2013.01); *G06F 2009/45579* (2013.01); *G06F 2009/45587* (2013.01)

(56) References Cited

U.S. PATENT DOCUMENTS

| | | | | |
|---|---|---|---|---|
| 8,170,859 | B1* | 5/2012 | Christensson | G06F 9/4812 703/22 |
| 8,260,603 | B2* | 9/2012 | Cherkasova | G06F 11/3447 703/23 |
| 8,726,364 | B2* | 5/2014 | Smith | G06F 21/575 711/163 |
| 8,949,825 | B1* | 2/2015 | Fitzgerald | G06F 9/45537 718/1 |
| 2003/0061497 | A1* | 3/2003 | Zimmer | G06F 21/575 713/189 |
| 2004/0003288 | A1* | 1/2004 | Wiseman | G06F 21/57 726/30 |
| 2004/0230970 | A1* | 11/2004 | Janzen | G06F 9/45537 717/174 |
| 2004/0250120 | A1* | 12/2004 | Ng | G06F 21/6227 726/17 |
| 2005/0204357 | A1* | 9/2005 | Garg | G06F 9/4426 718/1 |
| 2005/0235123 | A1* | 10/2005 | Zimmer | G06F 12/126 711/170 |
| 2005/0246453 | A1 | 11/2005 | Erlingsson et al. | |
| 2006/0020940 | A1* | 1/2006 | Culter | G06F 9/5077 718/100 |
| 2006/0248526 | A1* | 11/2006 | Rostampour | G06F 9/45504 718/1 |
| 2007/0011486 | A1* | 1/2007 | Li | G06F 9/45533 714/5.11 |
| 2007/0089111 | A1* | 4/2007 | Robinson | G06F 21/53 718/1 |
| 2007/0162475 | A1* | 7/2007 | Jacobson | G06F 12/0802 |
| 2007/0250833 | A1* | 10/2007 | Araujo | G06F 21/6218 718/1 |
| 2008/0005748 | A1 | 1/2008 | Mathew et al. | |
| 2008/0134176 | A1* | 6/2008 | Fitzgerald | G06F 9/45537 718/1 |
| 2008/0134178 | A1* | 6/2008 | Fitzgerald | G06F 9/45537 718/1 |
| 2009/0300370 | A1* | 12/2009 | Yao | G06F 12/145 713/193 |
| 2009/0327741 | A1* | 12/2009 | Zimmer | G06F 21/575 713/183 |
| 2009/0327778 | A1* | 12/2009 | Shiga | G05D 23/1919 713/320 |
| 2010/0070970 | A1* | 3/2010 | Hu | G06F 9/45533 718/1 |
| 2010/0169633 | A1* | 7/2010 | Zimmer | G06F 21/575 713/2 |
| 2010/0319001 | A1* | 12/2010 | Jones | G06F 9/4411 718/108 |
| 2011/0029974 | A1* | 2/2011 | Broyles | G06F 21/57 718/1 |
| 2011/0035586 | A1* | 2/2011 | Clermont | G06F 21/53 713/164 |
| 2011/0047541 | A1 | 2/2011 | Yamaguchi et al. | |
| 2011/0083131 | A1* | 4/2011 | Pirzada | G06F 9/45533 718/1 |
| 2011/0093849 | A1 | 4/2011 | Chawla et al. | |
| 2011/0119669 | A1* | 5/2011 | McRae | G06F 9/45558 718/1 |
| 2011/0145609 | A1* | 6/2011 | Berard | G06F 1/3203 713/320 |
| 2011/0209140 | A1* | 8/2011 | Scheidel | G06F 8/61 717/172 |
| 2011/0238969 | A1* | 9/2011 | Warkentin | G06F 9/441 713/2 |
| 2011/0302444 | A1* | 12/2011 | Tashima | G06F 11/1417 714/2 |
| 2012/0102491 | A1* | 4/2012 | Maharana | G06F 9/45558 718/1 |
| 2012/0180076 | A1* | 7/2012 | Shutt | G06F 9/4411 719/327 |
| 2012/0226895 | A1* | 9/2012 | Anderson | G06F 21/575 713/2 |
| 2012/0311576 | A1* | 12/2012 | Shu | G06F 9/45558 718/1 |
| 2013/0151831 | A1* | 6/2013 | Bealkowski | G06F 9/4401 713/2 |
| 2014/0047229 | A1* | 2/2014 | Wiseman | G06F 13/14 713/2 |
| 2014/0282500 | A1* | 9/2014 | Parthiban | G06F 9/45533 718/1 |

FOREIGN PATENT DOCUMENTS

| | | |
|---|---|---|
| JP | 2002-183076 | 6/2002 |
| JP | 2004-178578 | 6/2004 |
| JP | 2088-50315 | 1/2008 |
| JP | 2008-052713 | 3/2008 |
| JP | 2010-176412 | 8/2010 |
| WO | WO-2010039887 | 4/2010 |

OTHER PUBLICATIONS

Richard Wilkings et al., UEFI Secure Boot in Modern Computer Security Solutions, Sep. 2013, [Retrieved on Mar. 28, 2016]. Retrieved from the internet: <URL: http://staging.uefi.org/sites/default/files/resources/UEFI_Secure_Boot_in_Modern_Computer_Security_Solutions_2013.pdf> 10 Pages (1-10).*

Microsoft Tech Net; Ports and Protocols for VMM 2012; http://technet.microsoft.com/en-us/library/gg710871.aspx >; Mar. 22, 2011.

EPO; "Supplementary European Search Report" cited in Appl. No. 11873507.5; mailed Mar. 3, 2015; 3 pages.

* cited by examiner

VIRTUALIZED DEVICE CONTROL IN COMPUTER SYSTEMS

CROSS-REFERENCE TO RELATED APPLICATION

This application is a U.S. National Stage Application of and claims priority to International Patent Application No. PCT/US2011/054110, filed on Sep. 30, 2011, and entitled "VIRTUALIZED DEVICE CONTROL IN COMPUTER SYSTEMS," which is hereby incorporated by reference in its entirety.

BACKGROUND

Computer systems, such as desktop computers, notebook computers, and the like, can include a variety of peripheral devices embedded therein ("embedded devices"). Examples of embedded devices include a network interface card (NIC), a camera, a modem, a microphone, speakers, various input/output (IO) interfaces (serial, parallel, universal serial bus (USB), etc.), wireless radios, and the like. Computer systems can also include embedded device control mechanisms to allow embedded devices to be selectively enabled or disabled. These control mechanisms can be useful in various environments, such as enterprise environments, where there are requirements that some embedded devices be disabled for various reasons (e.g., data security, lower support burden, etc.). The particular embedded devices that need to be disabled can vary from enterprise to enterprise, as well as from user to user within each enterprise.

BRIEF DESCRIPTION OF THE DRAWINGS

Some embodiments of the invention are described with respect to the following figures.

DETAILED DESCRIPTION

Figure 1:
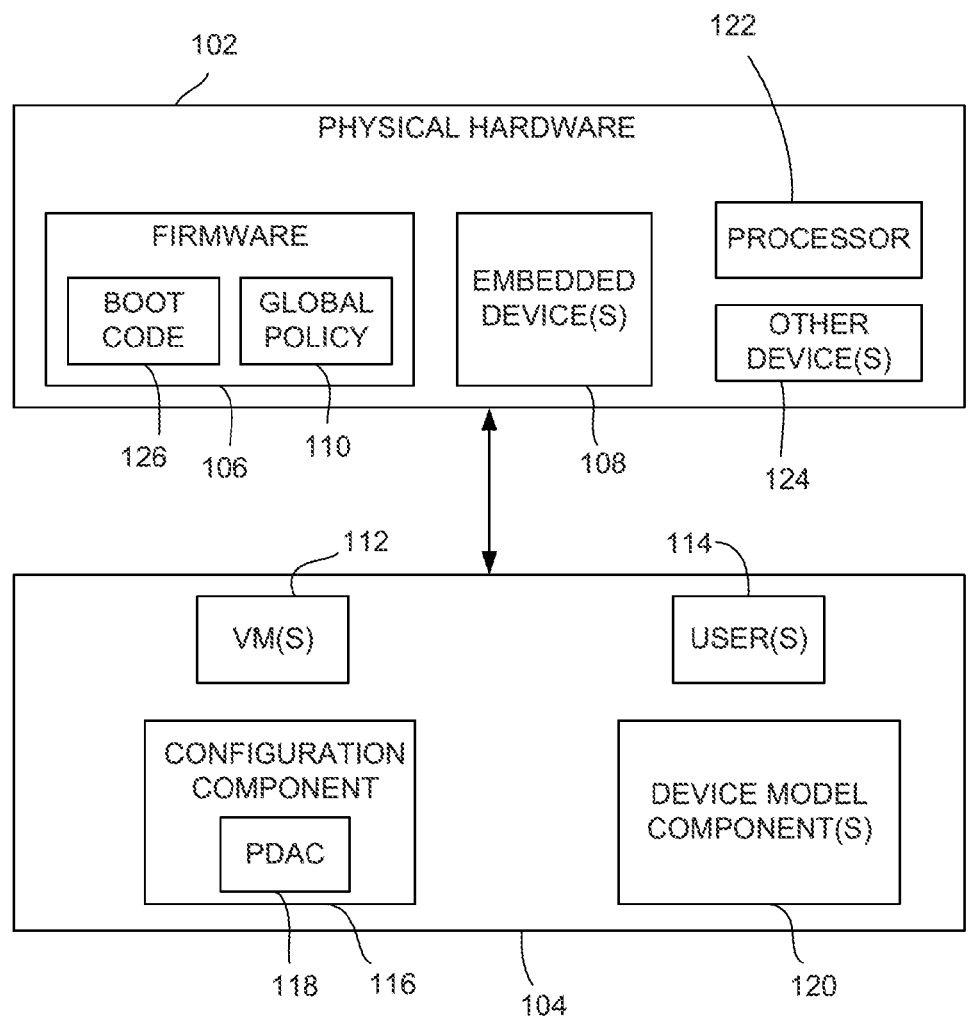
FIG. 1 is a block diagram of a computer system according to an example implementation.

FIG. 1 is a block diagram of a computer system 100 according to an example implementation. The computer system 100 includes physical hardware 102 and a hypervisor 104. The computer system 100 can be implemented as any type of desktop computer, mobile computer, or the like. The physical hardware 102 includes a memory to store firmware ("firmware 106"), a processor 122, and at least one embedded device ("embedded device(s) 108"). The physical hardware 102 can include various other devices 124, such as memory, cache, power supplies, clock circuits, data registers, IO circuits, and the like. The embedded device(s) 108 can include various devices peripheral to the processor 122, such as wireless interfaces (e.g., IEEE 802.11, BLUETOOTH, etc.), network interfaces, imaging devices, audio devices, modems, serial ports, parallel ports, memory readers, universal serial bus (USB) ports, FIREWIRE ports, and like type peripheral devices. The firmware 106 can be implemented using non-volatile memory, such as electronically erasable programmable read only memory (EEPROM), FLASH memory, or the like. The processor 108 can include one or more of any type of microprocessor.

The firmware 106 can include boot program code 126 that is executed by the processor 122 upon power-up or reset of the physical hardware 102 (e.g., basic input/output system (BIOS), unified extensible firmware interface (UEFI), or like type firmware interface). The firmware 106 can further include a device configuration policy that defines access permissions to the embedded device(s) 108 for the physical hardware 102 (referred to as "global policy 110"). In an example, the global policy 110 can be implemented by the boot program code 126 or using separate stand-alone program code stored in the firmware 106 and executable by the processor 122. The access permissions defined in the global policy 110 are "global access permissions" for the embedded device(s) 108. In general, the global access permissions control access to the embedded device(s) 108 in the physical hardware 102. The global access permissions can include, for example, whether device(s) are enabled or disabled at power-up or reset of the physical hardware 102 ("boot time"). As described further below, the global access permissions can also include whether access to the device(s) can be modified by the hypervisor 104, and whether the device(s) are visible or hidden from the hypervisor 104. The global access permissions are discussed further below. The global access permissions defined by the global policy 110 can be implemented at boot time.

Elements of functionality of the hypervisor 104 can be provided through execution of machine-readable instructions by the physical hardware 102 (e.g., using the processor 122). In general, the hypervisor 104 provides hardware virtualization for one or more virtual machines. The hypervisor 104 includes at least one virtual machine ("virtual machine(s) 112"), at least one defined user ("user(s) 114"), a configuration component 116, and at least one device model component ("device model component(s) 120"). Each of the virtual machine(s) 112 can include a software implementation of a machine (e.g., computer) that includes an operating system (sometimes referred to as a "guest operating system"). When a virtual machine 112 is booted, the hypervisor 104 manages an instance of the virtual machine ("virtual machine instance") for use by one or more of the user(s) 114.

The configuration component 116 defines additional access permissions for the embedded device(s) 108 in a virtual device configuration policy ("policy for device access control (PDAC) 118"). The PDAC 118 can define access permissions for the user(s) 114 and/or the VM(s) 112. In an example, the PDAC 118 is subordinate to the global policy 110 (i.e., permissions defined in the global policy can take precedence over permissions defined in the PDAC 118 if so configured). For example, the global policy 110 can define whether access to the embedded device(s) 108 can be modified by the hypervisor 104. If the global policy 110 prevents changes to access of a particular embedded device, then any permission defined in the PDAC 118 for that particular device will not be effective. If the global policy 110 allows changes to access of a particular embedded device, then permissions defined in the PDAC 118 can affect access to that device (e.g., the PDAC 118 can change the access permission defined in the global policy 110). In some examples, the global policy 110 can make its access permissions visible or invisible to the hypervisor 104 and thus to the configuration component 116. If access permissions to device(s) are invisible, then the PDAC 118 does not have permissions established for those device(s).

In an example, the PDAC 118 can include a user device configuration policy ("user policy") and a VM device configuration policy ("VM policy"). The user policy can define access permissions ("user access permissions") to the embedded device(s) 108 for each of the user(s) 114. The VM policy can define access permissions ("VM access permissions") to the embedded device(s) 108 for each of the VM(s) 112. In an example, the VM access permissions have priority over the user access permissions if so configured (the global access permissions in the global policy 110 have highest priority).

For example, consider an embedded device A. The access permissions in the global policy 110 can be defined such that the hypervisor 104 is allowed to change access to embedded device A, and that embedded device A is enabled at boot time. The access permissions in the PDAC 118 can be defined such that embedded device A is enabled for VM 1, but disabled for user X. While embedded device A is enabled for other user(s) of VM 1, embedded device A will be disabled for user X. The access permissions in the PDAC 118 can be defined such that embedded device A is disabled for VM 2 (since the global policy 110 allowed the change). In an example, no user access permission can allow access to embedded device A in VM 2, since embedded device A is disabled in VM 2 in general (for all users).

In another example, access permissions in the global policy 110 can be defined such that the hypervisor 104 does not permit changes to access of embedded device B, and that embedded device B is disabled. Thus, no access permissions in the PDAC 118 can enable embedded device B for any VM and/or user.

In an example, the configuration component 116 includes a user interface. One or more of the user(s) 114 can have access to the configuration component 116 and employ the user interface to establish the PDAC 118. In an example, the configuration component 116 can be accessible from instances of the VM(s) 112.

The device model component(s) 120 provide an interface between the physical hardware 102 and the VM(s) 112. The device model component(s) 120 can include, for example, virtual BIOS, virtual device models for individual devices, and the like. The device model component(s) 120 establish a virtual hardware definition for each instance of the VM(s) 112 based on the global policy 110 and the PDAC 118. The virtual hardware definition models or otherwise provides access to only those embedded devices enabled by a concatenation of the global policy 110 and the PDAC 118. Thus, the virtual hardware exposed to each of the VM(s) 112 can be customized for each instance of the VM(s) 112.

Accordingly, policy driven configuration can be provided in the domain of the hypervisor 104 that allows for extension of embedded device control into the VMs 112. The embedded device control can be applied to each instance of the VMs 112 through customized virtual hardware definition at VM launch. Thus, the user(s) 114 do not have to restart the physical hardware 102, which would shut down all VM instances, in order to apply policy changes on embedded device access for a specific VM.

Figure 2:
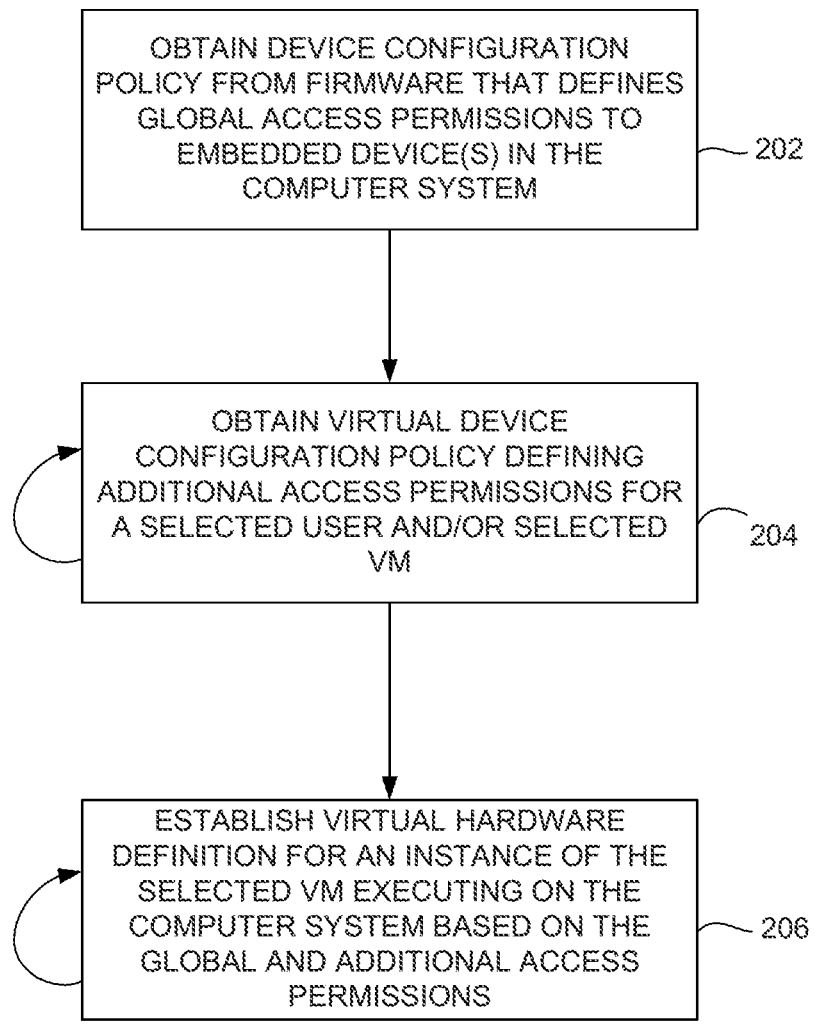
FIG. 2 is a flow diagram of a method of virtual device control in a computer system according to an example implementation.

FIG. 2 is a flow diagram of a method 200 of virtual device control in a computer system according to an example implementation. The method 200 begins at step 202, where a device configuration policy is obtained from firmware that defines global access permissions to embedded device(s) in the computer system. At step 204, a virtual device configuration policy is obtained that establishes additional access permissions for at least one of a selected user or a selected VM. The virtual device configuration policy defines additional access permissions to the embedded device(s). Step 204 can be repeated for additional selected user(s) and/or selected VMs. At step 206, a virtual hardware definition is established for an instance of the selected VM executing on the computer system based on the global access permissions and the additional access permissions. Step 206 can be repeated for additional VM instances.

Figure 3:
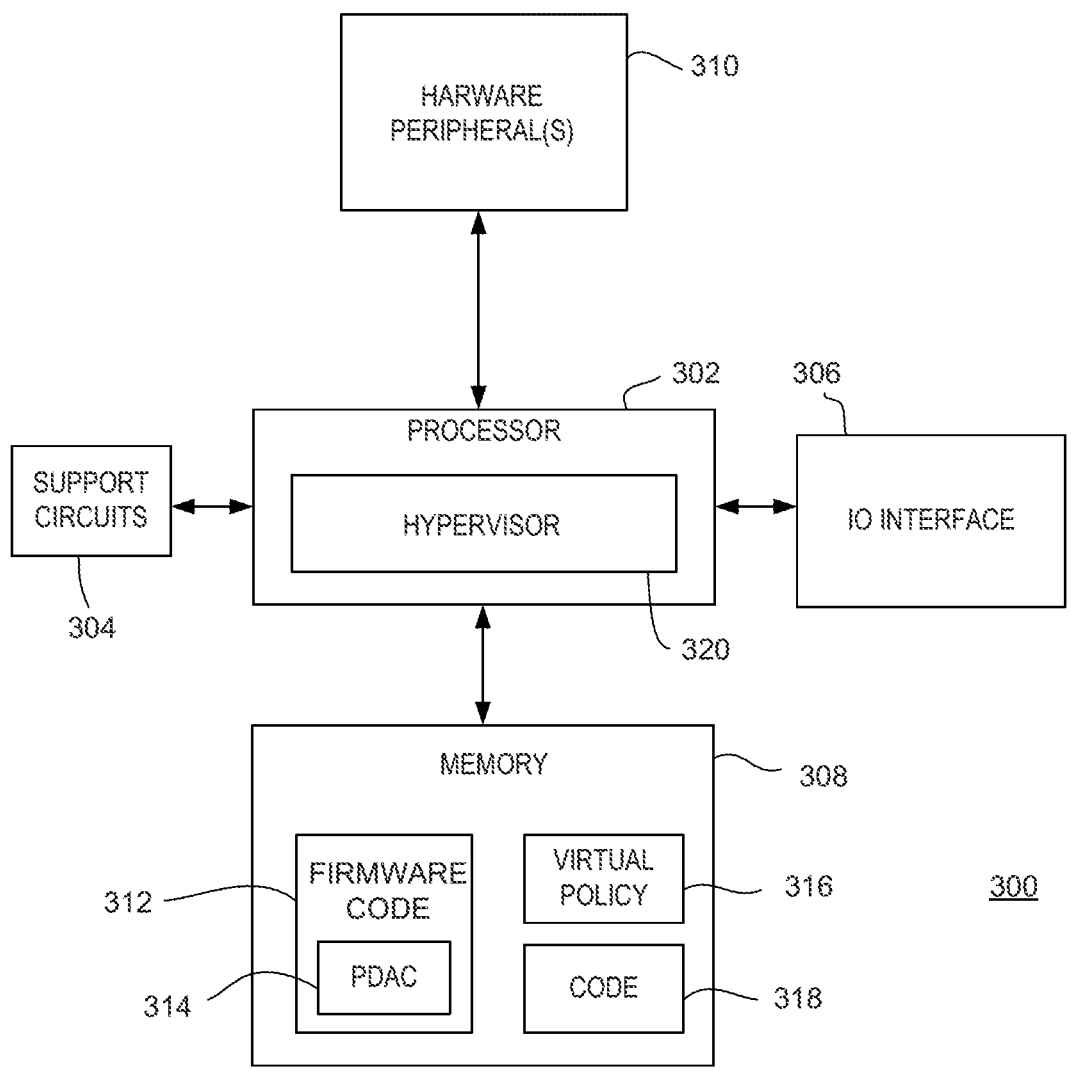
FIG. 3 is a block diagram depicting a computer according to an example implementation.

FIG. 3 is a block diagram depicting a computer 300 according to an example implementation. The computer 300 includes a processor 302, an IO interface 306, and a memory 308. The computer 300 can also include support circuits 304 and hardware peripheral(s) 310 (e.g., embedded devices). The processor 302 includes any type of microprocessor, microcontroller, microcomputer, or like type computing device known in the art. The support circuits 304 for the processor 302 can include cache, power supplies, clock circuits, data registers, IO circuits, and the like. The IO interface 306 can be directly coupled to the memory 308, or coupled to the memory 308 through the processor 302. The memory 308 can include random access memory, read only memory, cache memory, magnetic read/write memory, or the like or any combination of such memory devices. The hardware peripheral(s) 310 can include various hardware circuits that perform functions on behalf of the processor 302.

The hypervisor 320 can be implemented through execution of machine-readable instructions by the processor 302. The memory 308 can store code 318 that is executed by the processor 302 to implement the hypervisor 320 and its various functions. The memory 308 also stores firmware code 312 having a global policy 314, and a PDAC 316. The global policy 314 includes global access permissions to the hardware peripherals 310 that are applied at boot time. The PDAC 316 includes additional access permissions to the hardware peripherals 310 that are applied to VM instances managed by the hypervisor 320. As described above, the hypervisor 320 establishes virtual hardware definitions for each of the VM instances based on the global policy 314 and the PDAC 316.

The methods described above may be embodied in a computer-readable medium for configuring a computing system to execute the method. The computer readable medium can be distributed across multiple physical devices (e.g., computers). The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc., just to name a few. Other new and various types of computer-readable media may be used to store machine readable code discussed herein.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:
1. A method of virtual device control, comprising:
   obtaining a device configuration policy from firmware in a personal computer system, the device configuration policy defining global access permissions to at least one embedded device embedded in the personal computer system, the global access permissions applied at boot time, wherein the embedded device is not a processor or memory;

obtaining a second virtual device configuration policy established for at least one of a user or a virtual machine (VM), the second virtual device configuration policy defining additional access permissions to the at least one embedded device; and establishing a virtual hardware definition for an instance of the VM executing on the computer system based on the global access permissions and the additional access permissions.

2. The method of claim 1, wherein the second virtual device configuration policy includes a user device configuration policy defining user access permissions to the at least one embedded device for the user, and a VM device configuration policy defining VM access permissions to the at least one embedded device for the VM.

3. The method of claim 2, wherein the VM access permissions take precedence over the user access permissions, and the global access permissions take precedence over the VM access permissions.

4. The method of claim 1, wherein the global access permissions take precedence over the additional access permissions.

5. The method of claim 1, wherein the computer system includes a hypervisor to support a plurality of VMs, including the VM, and a plurality of users, including the user.

6. The method of claim 1, wherein the embedded device is selected from the group consisting of a wireless interface, a network interface, an imaging device, an audio device, a modem, a serial port, a parallel port, a memory reader, a universal serial bus (USB) port, and a FIREWIRE port.

7. A computer system, comprising:

physical hardware including a processor, a firmware, and at least one embedded device, the firmware to store a device configuration policy defining global access permissions to the at least one embedded device applicable at boot time, wherein the at least one embedded device comprises at least one of a peripheral device and a port; and a hypervisor to execute on the processor, support at least one virtual machine (VM) and at least one user, establish a second virtual device configuration policy that defines additional access permissions to the at least one embedded device based on at least one of user identity and virtual machine identity, and establish a virtual hardware definition for each instance of the at least one VM based on the global access permissions and the additional access permissions.

8. The computer system of claim 7, the second virtual device configuration policy includes a user device configuration policy defining user access permissions to the at least one embedded device, and a VM device configuration policy defining VM access permissions to the at least one embedded device.

9. The computer system of claim 8, wherein the VM access permissions take precedence over the user access permissions, and the global access permissions take precedence over the VM access permissions.

10. The computer system of claim 7, wherein the hypervisor includes at least one component that provides a device model for each of the at least one embedded device, the at least one component to process the global access permissions and the additional access permissions to provide the virtual hardware definition for each instance of the at least one VM.

11. The computer system of claim 7, wherein the hypervisor includes a configuration component to generate the second virtual device configuration policy.

12. computer system of claim 7, wherein the global access permissions allow the hypervisor to change access to a first embedded device, and wherein the global access permissions disable access to a second embedded device.

13. A non-transitory computer readable medium having instructions stored thereon that when executed by a processor cause the processor to perform a method of virtual device control in a computer system, comprising:

obtaining a device configuration policy from firmware in the computer system, the device configuration policy defining global access permissions to at least one embedded device in the computer system applied at boot time;

obtaining a second virtual device configuration policy established for at least one of a user or a virtual machine (VM), the second virtual device configuration policy defining additional access permissions to the at least one embedded device, wherein the additional access permissions permit access to a first embedded device in the computer system and prohibit access to a second embedded device in the computer system; and establishing a virtual hardware definition for an instance of the VM executing on the computer system based on the global access permissions and the additional access permissions.

14. The computer readable medium of claim 13, wherein the second virtual device configuration policy includes a user device configuration policy defining user access permissions to the at least one embedded device for the user, and a VM device configuration policy defining VM access permissions to the at least one embedded device for the VM.

15. The computer readable medium of claim 14, wherein the VM access permissions take precedence over the user access permissions, and the global access permissions take precedence over the VM access permissions.

16. The computer readable medium of claim 13, wherein the global access permissions take precedence over the additional access permissions.

17. The computer readable medium of claim 13, wherein the computer system includes a hypervisor to support a plurality of VMs, including the VM, and a plurality of users, including the user.

18. The computer readable medium of claim 13, wherein the additional access permissions permit access to a first virtual machine to access the first embedded device and prohibit a second virtual machine from accessing the first embedded device.

19. The computer readable medium of claim 13, wherein the additional access permissions permit access to a first user to access the first embedded device and prohibit a second user from accessing the first embedded device.

* * * * *